(12) United States Patent
Simon et al.

(10) Patent No.: US 6,757,009 B1
(45) Date of Patent: *Jun. 29, 2004

(54) APPARATUS FOR DETECTING THE PRESENCE OF AN OCCUPANT IN A MOTOR VEHICLE

(75) Inventors: Marc R. Simon, Whitefish Bay, WI (US); Larry Matthies, La Canada, CA (US); William J. Janutka, West Allis, WI (US); Sabrina Elizabeth Kemeny, La Crescenta, CA (US)

(73) Assignee: Eaton Corporation, Cleveland, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1003 days.

(21) Appl. No.: 08/872,836

(22) Filed: Jun. 11, 1997

(51) Int. Cl.[7] ................................................ H04N 7/18
(52) U.S. Cl. .......................................... 348/148; 348/43
(58) Field of Search .................................. 348/143, 148, 348/42, 43, 46, 47, 153, 159; 382/100, 101, 41; 280/735

(56) References Cited

U.S. PATENT DOCUMENTS

| | | | |
|---|---|---|---|
| 4,843,463 A | * | 6/1989 | Michetti ..................... 348/148 |
| 5,193,124 A | * | 3/1993 | Subbarao ..................... 382/41 |
| 5,262,835 A | | 11/1993 | Lindqvist et al. ............... 356/2 |
| 5,471,515 A | | 11/1995 | Fossum et al. ................ 377/60 |
| 5,530,420 A | | 6/1996 | Tsuchiya et al. ............ 340/435 |
| 5,531,472 A | | 7/1996 | Semchena et al. .......... 280/735 |
| 5,653,462 A | | 8/1997 | Breed et al. ................. 280/735 |
| 5,670,935 A | * | 9/1997 | Schofield et al. ............ 348/148 |
| 5,835,613 A | * | 11/1998 | Breed et al. ............. 382/100 |
| 5,848,802 A | * | 12/1998 | Breed et al. ................. 280/735 |
| 5,871,232 A | * | 2/1999 | White ........................ 280/735 |
| 6,020,812 A | * | 2/2000 | Thompson et al. ......... 340/438 |
| 6,039,139 A | * | 3/2000 | Breed et al. ................. 180/271 |
| 6,066,954 A | * | 5/2000 | Gershenfeld et al. ....... 324/671 |

FOREIGN PATENT DOCUMENTS

| | | |
|---|---|---|
| EP | 781 689 A1 | 7/1997 |
| GB | 2301922 | 12/1996 |

* cited by examiner

*Primary Examiner*—Andy Rao
(74) *Attorney, Agent, or Firm*—George E. Haas; Quarles & Brady LLP

(57) ABSTRACT

A motor vehicle control system includes a pair of cameras for producing first and second images of a passenger area. A distance processor determines distances that a plurality of features in the first and second images are from the cameras based on the amount that each feature is shifted between the first and second images. An analyzer processed the distances and determine a size of an object on the seat. Additional analysis of the distance also may determine movement of the object and the rate of that movement. The distance information also can be used to recognize predefined patterns in the images and thus identify the object. A mechanism utilizes the determined object characteristics in controlling operation of a device, such as deployment of an air bag.

30 Claims, 6 Drawing Sheets

APPARATUS FOR DETECTING THE PRESENCE OF AN OCCUPANT IN A MOTOR VEHICLE

BACKGROUND OF THE INVENTION

The present invention relates to equipment for sensing the presence or absence of objects, and more particularly to detecting whether an occupant is present in a seat of a motor vehicle.

As a safety feature, modern motor vehicles incorporate air bags into the steering wheel in front of the driver and into the dashboard in front of a passenger in the forward seat. Additional air bags are being proposed for the doors to the sides of these occupants. Rapid deceleration of the motor vehicle during an accident is detected and activates inflation of the air bags which the cushion the occupants.

Although air bags have greatly decreased the severity of injuries from motor vehicle collisions, they occasionally cause injury to the passenger or driver because of the rapid rate with which the air bag must be deployed. In particular, the air bag may severely injure a small child or infant sitting in the front seat of the vehicle.

As a consequence, it is now recommended that small children and infants ride in the rear seat of the vehicle so as not to be exposed to the force of air bag deployment in the event of an accident. However, that does not address the situation which occurs when that recommendation is ignored and a child rides in the front seat of the vehicle. Furthermore, in two passenger vehicles, such as sports cars and trucks, a child or infant must be placed in a seat that faces an air bag. In this latter situation, it has been proposed to provide a manual override switch which will disable the air bag in front of the child. However, not only must this switch be manually operated whenever a child is present, the motor vehicle operator must remember to re-activate the air bag for adult passengers.

These precautions also do not address the presence of a relatively small adult occupant in a vehicle with an air bag designed to protect an larger person. Thus there is a need to be able to customize air bag operation in response to the size of an individual in the seat that is protected.

However, in order to dynamically configure the air bag, its control system must be able to reliably determine the occupant's size. One approach that has been suggested is to sense the weight of the person sitting on the seat. However, weight alone does not indicate the kinematics of a person during a crash. For example, a person with a low center of gravity and small upper torso will have dramatically different kinematics as compared to a person with a small waist and muscular upper body. That distinction in crash kinematics is very important in dynamically configuring air bag operation.

SUMMARY OF THE INVENTION

A general object of the present invention is to provide a mechanism for detecting the presence or absence of an occupant in a seat within a motor vehicle.

Another object is to implement that mechanism by means of a stereoscopic image processing system.

A further object is to provide such a system with the capability of determining the size of the seat occupant.

Yet another object of the present invention is to provide such a system with the capability of determining the sitting position of an occupant.

Another aspect of the present invention is to provide the stereoscopic image processing system with the ability to detect motion in order to distinguish inanimate objects placed on the seat.

A further aspect of the present invention is to provide information for configuring the operation of an air bag in a motor vehicle to conform to the physical characteristics of the seat occupant.

An additional aspect is to provide information about the occupant's kinematics in real time during a crash which would enable dynamic optimization of air bag performance.

These and other objects are satisfied by a stereoscopic object detection system which includes a pair of cameras that produce first and second images of the seat. Elements in the images are shifted in position between the first and second images by an amount corresponding to a distance the elements are from the cameras. A distance processor calculates the distances that a plurality of features in the first and second images are from the pair of cameras based on the shift of the position of those feature between the first and second images. An image analyzer determines presence of an object on the seat from the distances. The image analyzer also may determine the size of the object from the distances In the preferred embodiment of the stereoscopic object detection system, the distances are employed to detect movement of the object on the seat and the rate of that movement. Pattern recognition also can be performed on the distance information or on one of the first and second images to categorize the object.

In one application of the present invention, the image analysis results are used by a mechanism to control operation of a device on the motor vehicle. For example those results may be employed to configure deployment of an air bag in the motor vehicle to correspond to the physical characteristics of a person on the seat.

DETAILED DESCRIPTION OF THE INVENTION

Figure 1:
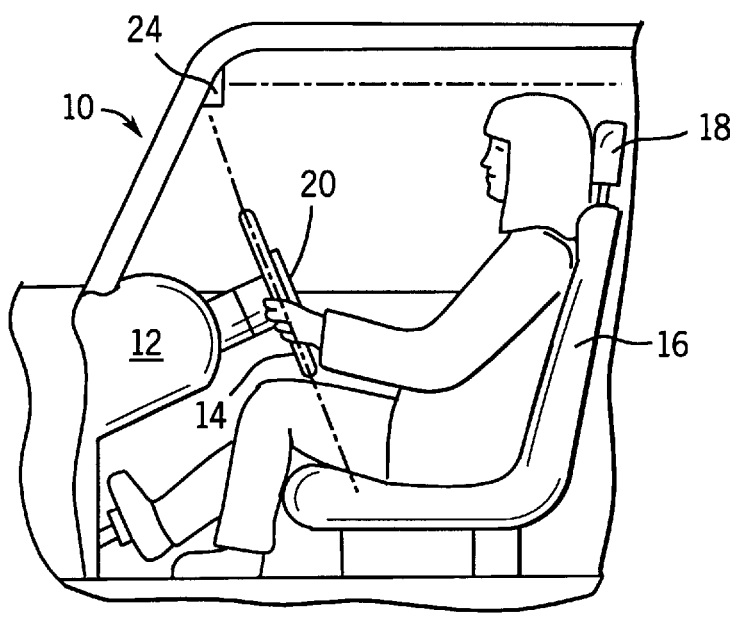
FIG. 1 is a side view of a motor vehicle incorporating an occupant detection system according to the present invention.
Figure 2:
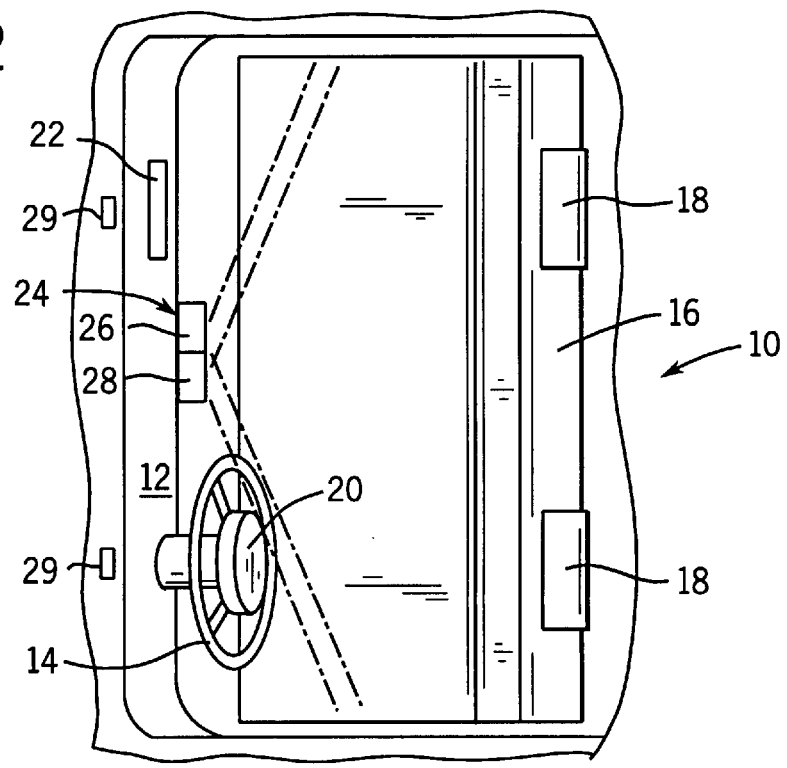
FIG. 2 is a view from above the front seat of the motor vehicle.

With reference to FIGS. 1 and 2, the front portion of the passenger compartment of an automobile 10 includes a dashboard 12 from which a steering wheel 14 projects. A front seat 16 is spaced from the dashboard 12 and includes a standard headrest 18 for both the passenger and driver. As the driver also is a vehicle passenger in the broad sense, the term "passenger" as used herein shall refer to the driver as well as other occupants of the vehicle. The steering wheel has a central compartment which houses a first air bag 20 and the dashboard has another compartment which contains a second air bag 22 located in front of the right portion of the seat 16.

Mounted above the windshield in the ceiling of the passenger compartment is an assembly 24 of two separate video cameras 26 and 28 mounted side-by-side across the vehicle in the same plane. Each camera 26 and 28 preferably is an imager in which each pixel location is randomly accessible, thereby enabling designated segments of their images to be fed to an output without having to read out the remaining image portions. Imagers of this type are referred to as an "active pixel sensor" (APS) and are described in U.S. Pat. No. 5,471,515, the description of which is incorporated herein by reference. Alternatively other types of imagers, such as charged coupled devices (CCD), could be employed with the sacrifice of the ability to randomly access image segments. Preferably the cameras 26 and 28 are responsive to near infra-red light and one or more sources 29 of infra-red light are mounted above the windshield to illuminate the front seat 16 of the vehicle. Such illumination allows operation of the present system at night without affecting an occupant's ability to see the highway. In addition the illumination from source 29 fills in image shadows during daytime operation.

The left camera 28 has a horizontal viewing area indicated by the long dash lines in FIG. 2, whereas the right camera 26 has a horizontal viewing area indicated by the long and short dashed lines. The vertical viewing angles of each camera 26 and 28 are the same as indicated by the dashed lines in FIG. 1. The left and right cameras 26 and 28 produce a first and second pair of stereoscopic images of the front seat 16 of the motor vehicle, as well as the body of occupant locations on that seat. Because the two cameras 26 and 28 are offset left to right across the vehicle, the first and second images, which are acquired substantially simultaneously, will contain essentially the same objects, but the objects will be shifted horizontally between the two images. This produces a stereoscopic pair of images which can be analyzed to determine distances from the cameras to objects in the vehicle. As will be described, that analysis employs well known photogrammetry techniques such as those used to measure height of geographic features in aerial photographs. Alternatively, a single imaging device may be used with two sets of lens and mirror to focus a stereoscopic pair of images side-by side into the same imaging device. This alternative is considered to be equivalent to employing a separate camera for each stereoscopic image.

Although the left and right halves of the stereoscopic images are processed to determine the presence, positions and sizes of two passengers on seat 16, for ease of explanation the processing of only half of the image will be described with the understanding that both halves are processed in the same manner.

Figure 3:
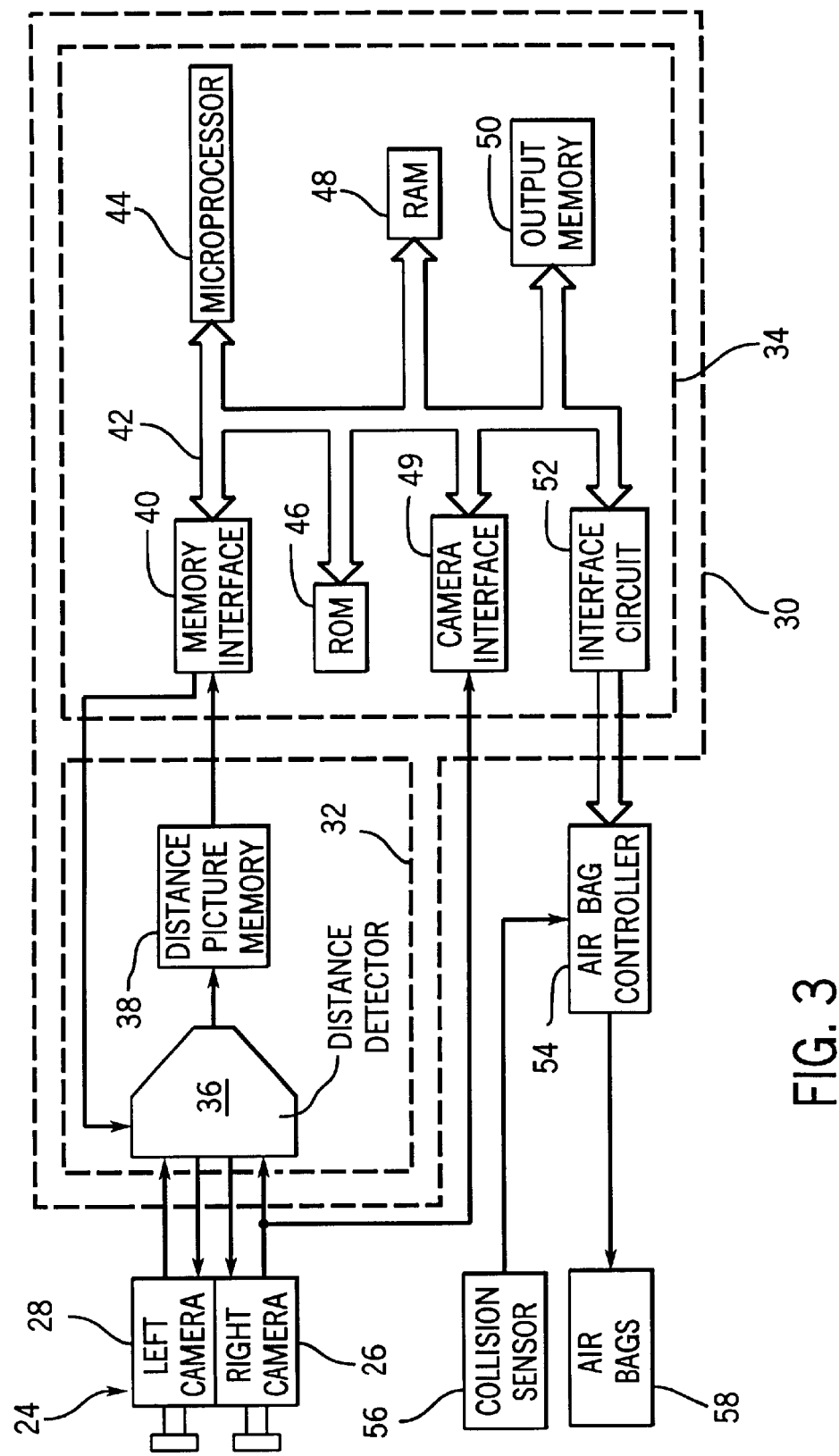
FIG. 3 is a schematic block diagram of the present stereoscopic image processing system to detect occupants in the motor vehicle seat.

With reference to FIG. 3, the images from the right and left cameras 26 and 28 are applied to the inputs of an image processor 30. The image processor 30 comprises a distance subprocessor 32 which determines the distance that objects in the images are from the camera assembly 24, and a distance picture processing system 34 which analyzes the distance measurements to determine the presence, size and other characteristics of an occupant on the motor vehicle seat 16.

The distance subprocessor 32 comprises a distance detector 36 which locates the same feature in each stereoscopic image and calculates the distance to that feature. That distance measurement is stored within memory 38 as an element of a distance picture. The distance subprocessor 32 is similar to one described in U.S. Pat. No. 5,530,420, the description of which is incorporated herein by reference.

The distance picture memory 38 is accessible by both the distance detector 36 and by the distance picture processing system 34 via a memory interface 40. The memory interface 40 is connected to a set of data, address and control buses 42 which also connect to a microprocessor 44. The microprocessor executes a program that is stored within a read-only memory 46 which analyzes the distance picture data, as will be described. A random access memory (RAM) 48 is connected to the buses 42 to store intermediate results and other data utilized by the microprocessor 44 during that analysis. The microprocessor 44 also may acquire a visual image directly from the right video camera 26 via a camera interface 49 connected to buses 42. An output memory 50 is provided to hold the results of the distance picture analysis and an interface circuit 52 communicates those results to devices outside the distance picture processing system 34. In the case where the present system governs the operation of an air bag within the motor vehicle, the interface circuit 52 is connected to inputs of an air bag controller 54. That controller 54 also receives an indication from a collision sensor 56 when an accident is occurring. The collision sensor 56 may provide an indication of the severity of the crash, e.g. rate of deceleration. The air bag controller 54 responds to these inputs by activating the driver and passenger air bags 58.

The stereoscopic images are processed on a timed interrupt basis, for example every ten seconds the entire stereoscopic image is analyzed, while only selected portions of the two images are processed every millisecond. The full image processing commences at step 70 in the flow chart of FIG. 4A with periodic acquisition of the two stereoscopic images from the right and left video cameras 26 and 28. At that time the microprocessor 44 receives an interrupt signal and responds by issuing a full image acquisition command to the distance detector 36. Then at step 72, the distance detector 36 analyzes the acquired stereoscopic images to find a small group of picture elements in one image that match a group of picture elements in the other image, thus locating coinciding points on objects in each image. Such coinciding points may be object features such as edges, lines, and specific shapes.

Figure 5:
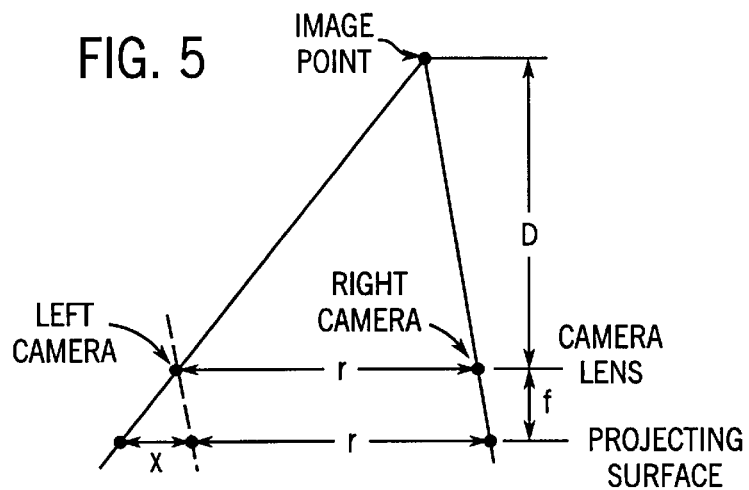
FIG. 5 depicts the geometry of the triangulation method employed to determine the distance between the cameras and an object in the vehicle.

The distance detector 36 upon locating the corresponding point in both images, utilizes photogrammetric triangulation in determining the distance that such a point on an object in the images is the plane of the camera lens. That process is well known, see Paul R. Wolf in *Elements of Photogrammetry*, 1974, McGraw-Hill, Inc. As shown in FIG. 5, the left and right cameras are spaced a distance r apart in the plane of the camera lens and each camera has focal points a distance f behind the camera lens plane. Because of the left to right offset distance r between the two cameras, a discrepancy amount x will exist between the same point in each camera image. Therefore the distance D between the camera lens plane and the image point can be determined from the expression: $D=r(f/x)$. The values for r and f are known from the design of the camera assembly 24.

The discrepancy amount x between the right and left images is determined at step 74 based on the difference in pixel locations of the coinciding point in the two images and the width of each pixel. By inserting this value of x into the above expression, the distance detector 36 at step 76 computes the distance value D which is stored in memory 38 at step 78 as one of many elements of a distance picture. As will be described the distance picture memory 38 is capable of storing two distance pictures with data for a new set of stereoscopic images replacing the older distance picture. Thus the two most recently derived distance pictures always will be retained in the memory 38.

Figure 6:
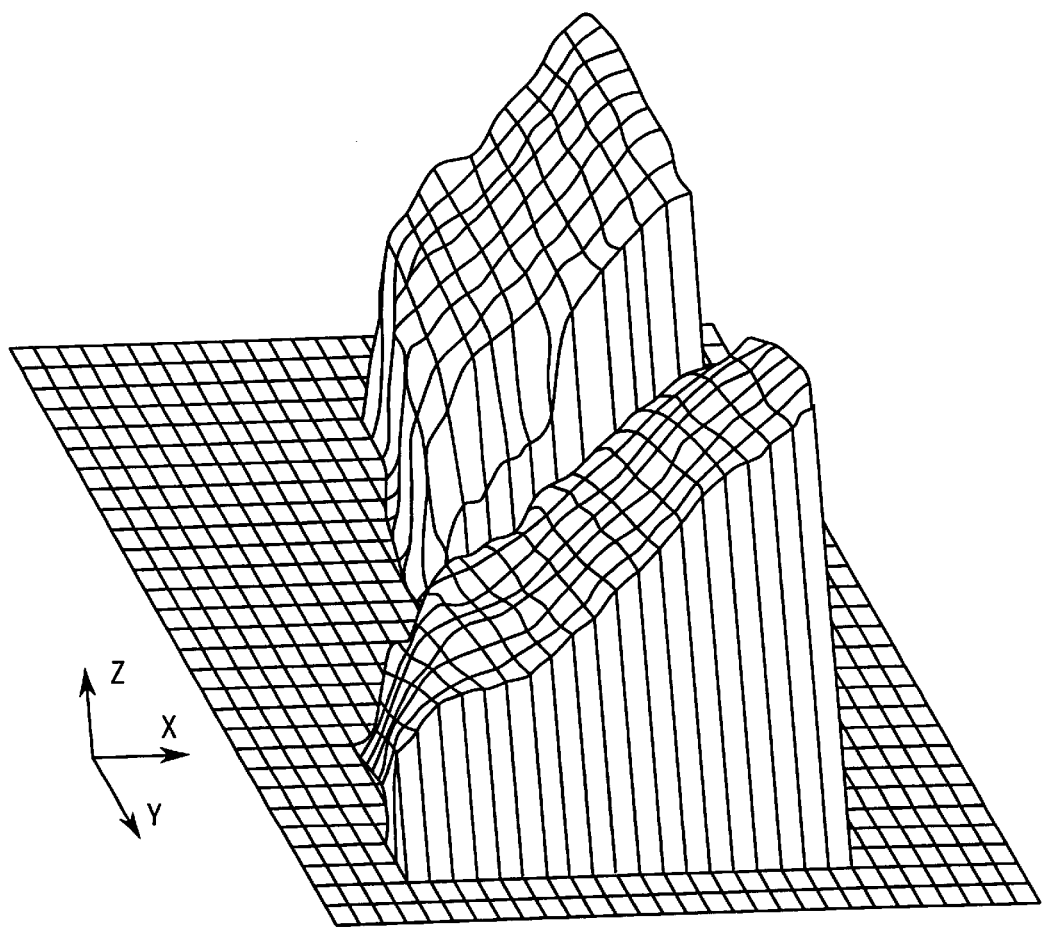
FIG. 6 graphically depicts distance image data developed by the stereoscopic image processing system.

Then, a determination is made at step 80 whether more coinciding points have to be located and processed in the stereoscopic images. When all of the coinciding image points have been processed, the distance picture is a two dimensional array of data with each location in the array containing the distance for the correspondingly located point in the stereoscopic images. Thus, the data within the distance picture could be plotted graphically as a relief map of the image in terms of distance from the camera lens plane. An example of such a three dimensional plot is shown in FIG. 6 where x and y axes correspond to the pixel locations within the camera image and the z axis corresponds to the magnitude of the distance data for each pixel location. At the outer edges of the distance picture, the data is relatively flat corresponding to the surface of the seat 16, whereas the central portion of the image corresponds to an object which is placed on the seat. In point of fact, the distance values corresponding to the seat will be larger than those corresponding to the object as the vehicle seat 16 is farther from the camera. Nevertheless, it should be noted that the edges of the object are denoted by abrupt, large transitions in the distance data. This enables the outer boundaries of the object to be found. As will be described, the volume of an object in the image can be derived by determining the average x and y dimensions between the object boundaries and the average distance valve.

Figure 4A:
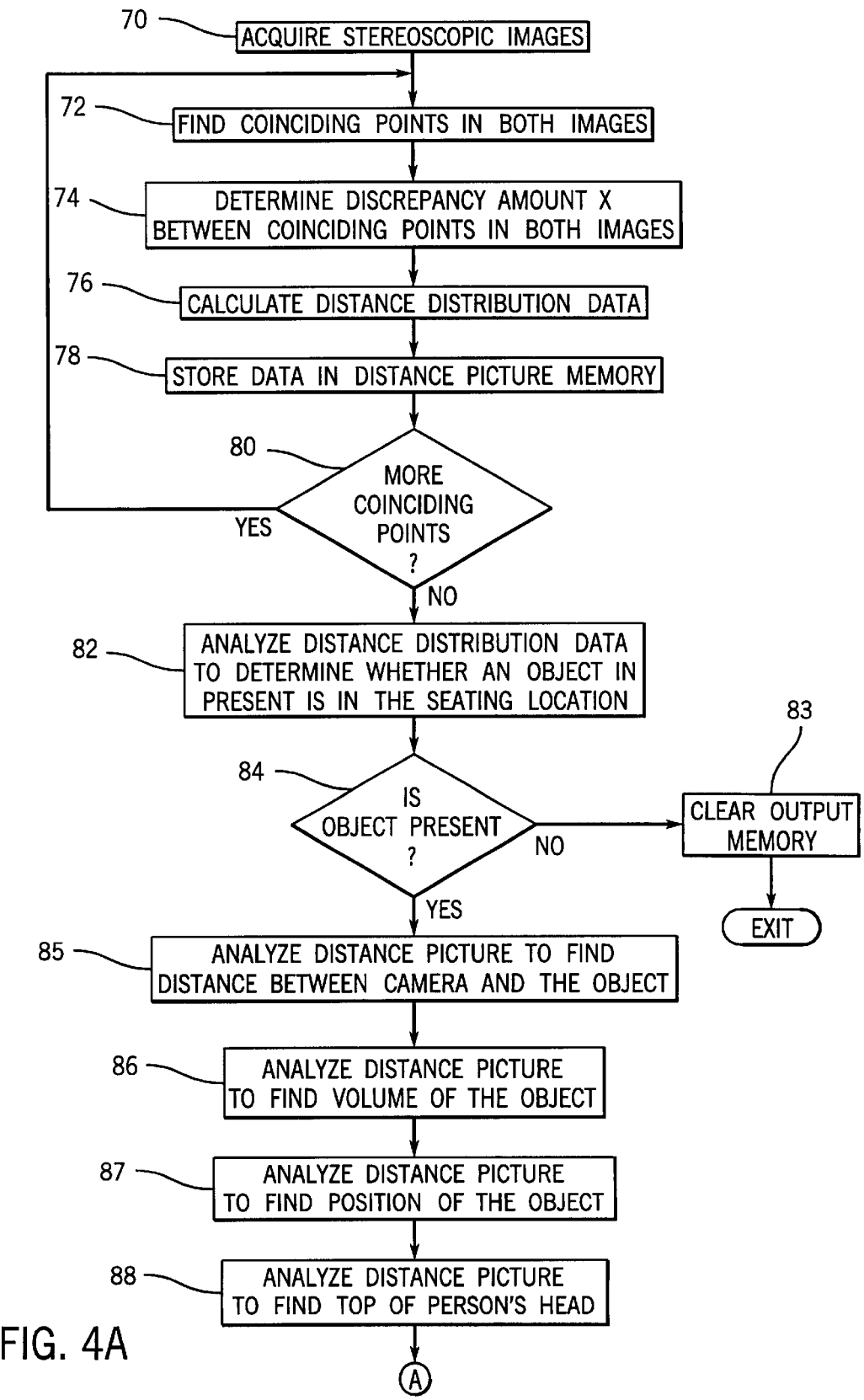
FIGS. 4A and 4B form a flowchart of the method by which the full stereoscopic images are processed.

Referring again to the flowchart of FIG. 4A, to analyze the distance picture, the microprocessor 44 at step 82 scans the distance picture to determine the difference between the data values corresponding to the seat 16 and the image portion which is closest to the camera. When the difference between the distance to the seat 16 and the distance to other image features exceeds a threshold amount, the microprocessor 44 concludes that an object is present on the seat 16. In order to avoid erroneous conclusions as may be produced by one or two spurious data points denoting a very close location to the camera, the microprocessor may require that there be a relatively significant number of points at which the distance exceeds that threshold in order to conclude that an object is present on the seat 16. That determination is made at step 84 in the image analysis and if true a flag is set in output memory 50. If it is concluded that a significant object is not present, the output memory 50 is cleared at step 83 and further analysis of the distance image terminates.

When the microprocessor 44 concludes that the data indicates a person may be present, the distance picture is analyzed further at step 85 to find the average distance between the camera and the person. The result of that calculation is stored within the output memory 50. Next, at step 86, the distance picture in memory 38 is analyzed to approximate the volume of the person in the seat 16. In doing so, the microprocessor 44 looks for the horizontal and vertical boundaries of the person which are indicated by relatively large transitions in the distance data as seen in FIG. 6. This provides a contour of the outer boundary of the person and standard techniques can be utilized to calculate the area within that boundary. Next the previously calculated average distance between the seat 16 and the object is used as the third dimension of the person in the volume calculation. The result is stored in output memory 50.

At step 87 the left to right position of the person is found by determining the location of the volume with respect to the border of the image. It is useful to know how close a passenger is to the door in order to control the deployment of a side air bag. A further inspection can be made to determine the position of the volume with respect to the lower border of the image which indicates whether a large passenger has slid down in the seat. The position information also is stored in output memory 50.

Then, at step 89, an analysis is performed on the distance picture to find key physical features, such as the top of the person's head. This can be determined by looking for a relatively large transition in the data proceeding downward from the top of the distance picture. This location of the top of the head indicates the relative height of the passenger. The results of all these analyses at steps 85–88 are stored within the output memory 50 of the distance picture processing system 34.

Figure 4B:
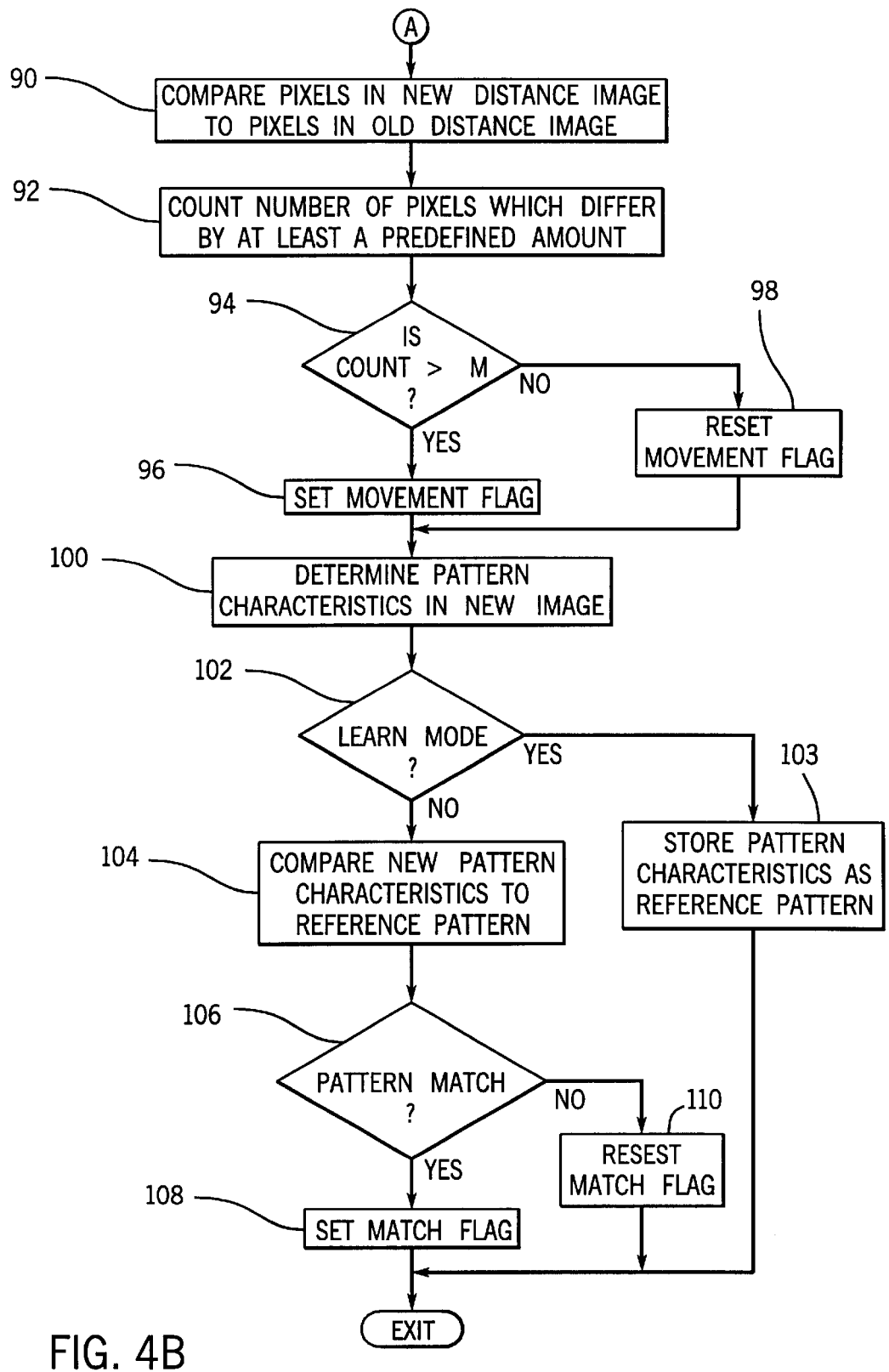

In many applications the image processing described thus far provides sufficient information for controlling a device, such as an air bag, on a motor vehicle. However, the image data may be analyzed further to provide additional information about the vehicle occupants. Subsequent processing can determine whether an object in the seat 16 is moving and thus distinguish between a large inanimate object and a person. To this end, the analysis by distance picture processing system 34 progresses to step 90 on FIG. 4B.

At this time the new distance picture in memory 38 is compared to the previous distance picture which also is stored in that memory. If motion has not occurred at one of the sitting positions in the vehicle seat 16 during the ten second image acquisition period, then a determination can be made that objects in the image are inanimate. This is accomplished at step 92 by comparing the two distance pictures, data element by data element, and counting the number of pairs of data elements that differ by more that a predefined amount. Alternatively, the two temporally different video images from either the right or left camera 26 or 28 can be compared to detect motion of an object. A slight variation is expected between two distance images derived at different points in time, even when only inanimate objects are present, because of movement due to vehicle vibration. Thus in determining motion, a negligible change in a given data point in the distance image will not be considered and a significant change of only a few data points also will be ignored. However a significant change of a substantial number of distance data points indicates movement of the object on the vehicle seat 16. The exact amount of change between the value of a given data point and the number of data points which must have such a change in order to be considered as indicating movement are functions of the response of the video cameras and the image resolution.

After comparing the two distance images, a determination is made at step 94 whether substantial number M of data points have changed by the requisite amount. In that case a movement flag in the output memory 50 is set at step 96 to indicate that the object at that sitting position has moved. Otherwise that movement flag is reset at step 98.

If desired, the image processing may continue by performing pattern recognition using any one of several well known pattern recognition techniques. For this purpose, the image processor 30 stores a reference, or master, pattern in random access memory 48. For example the reference pattern may be for an empty seat or an infant seat placed on the vehicle seat 16. The reference pattern is generated at step 100 by producing a distance picture of the reference stereoscopic images and processing that distance picture to derive the pattern data. For example the distance picture is processed to obtain object edge information which then is stored in random access memory 48 at step 103 by the program execution branching there from step 102.

Thereafter during image processing at step 100, similar pattern data is derived from a new set of stereoscopic images. That pattern data is compared at step 104 to the reference pattern. A determination is made by the microprocessor 44 at step 106 whether there is a substantial correspondence between the new image pattern and the reference pattern in which case an indicator flag is set in the output memory 50 at step 106. Otherwise that pattern match flag is reset at step 110. Alternatively the visual images directly from the right camera 26 can be acquired via camera interface 49 and processed for pattern recognition.

Processing of the entire distance image then terminates at which point the output memory 50 of the image processor 30 contains the results of the various analyses performed. The air bag controller 54 is able to obtain those stored results via the interface circuit 52 and evaluate the results in determining how to deploy the air bags 58 in the event of an accident. The periodic, e.g., once every ten seconds, analysis of the entire stereoscopic image thus enables continuing update of the operating parameters for the air bags. Such periodic review of the occupancy situation of the seat accounts for changes in the sitting position and other movement of the individual within the vehicle cabin.

When the image processor 30 results indicate that a person was not present within the seat 16, the air bag need not be deployed as such would serve no purpose. Furthermore, if the analysis by microprocessor 44 indicates that a person occupying the vehicle seat 16 has a relatively small volume and/or was relatively short as determined by the location of the top of that person's head, it is likely that the seat occupant is a child. In those cases, the air bag controller 54 would disable deployment of the air bag.

In a situation where the microprocessor 44 concluded that a sufficiently large person is present, the initial rate at which the air bag is inflated during an accident would be set to correspond to the occupant's volume, height and average distance to the air bag. Specifically, the closer the person is to the air bag and the larger the person, the faster the rate of deployment.

During the crash the kinematic information about the person's movement is useful to regulate the rate of air bag inflation to correspond to the severity of the accident. The faster the crash and the greater the forces acting on the occupant, the faster an air bag should inflate. The present image processing system also can provide kinematic information about the occupant without additional hardware.

Figure 7:
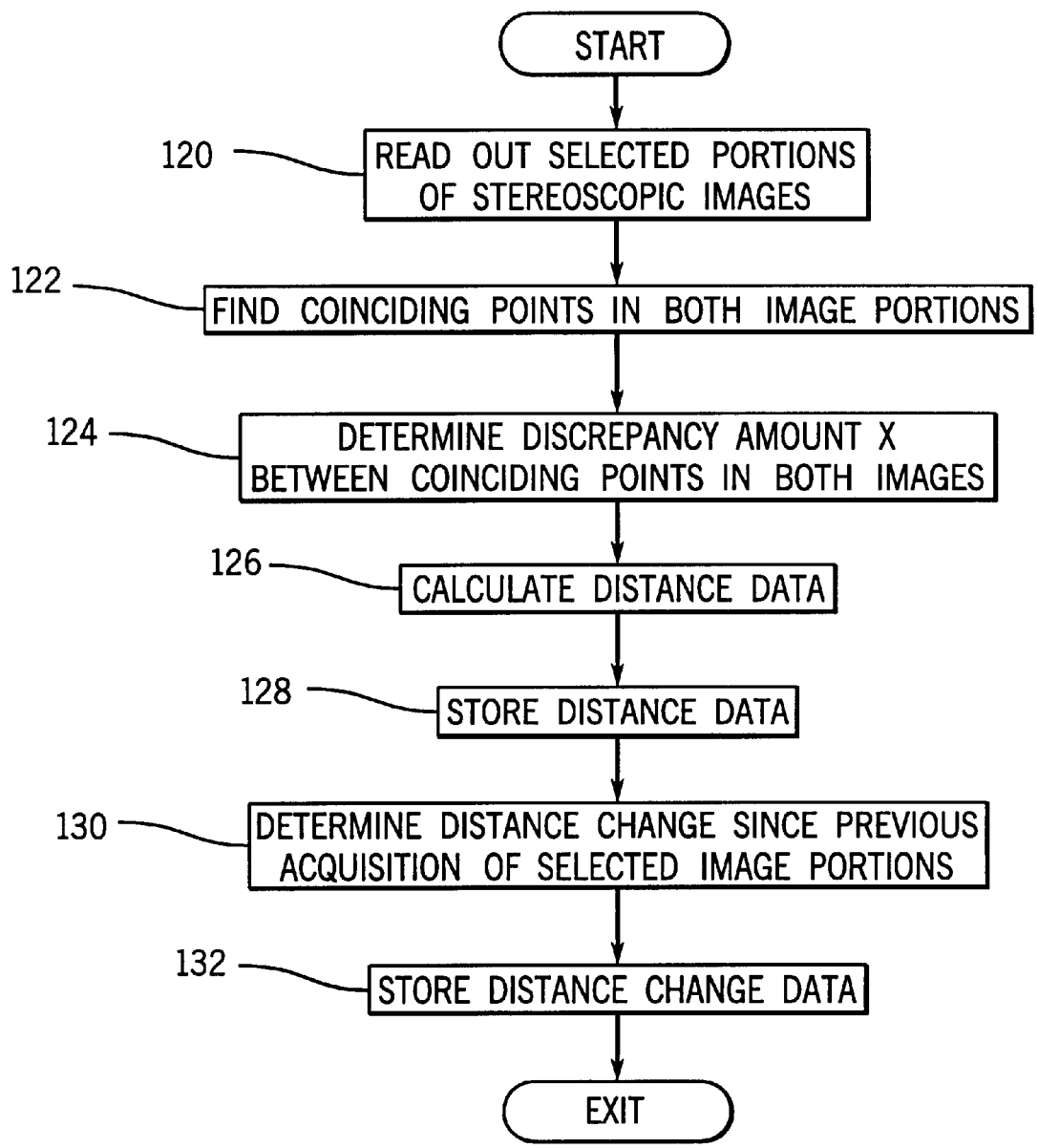
FIG. 7 is a flowchart of the method by which predefined segments of the stereoscopic images are processed in real time.

Therefore, present system processes selected segments of the stereoscopic images more frequently, than processing the entire images, to provide real time information as to how the occupant is moving during a crash. To this purpose, the microprocessor 44 also executes a interrupt routine depicted in FIG. 7 every millisecond, for example. This interrupt routine commences at step 120 with the microprocessor 44 sending a command to the distance subprocessor 32 via memory interface 40 which instructs the distance detector 36 to acquire and process a predefined portion of the stereoscopic images from video cameras 26 and 28. The predefined portion of each image may comprise two segments of ten columns of picture elements within each image which correspond to the center of the normal sitting positions for the seat occupants. These segments then are processed to determine parameters for controlling the air bag associated with those two sitting positions. For simplicity only the processing of the image segments for one of those sitting positions will be described.

The distance detector 36 at step 122 locates coinciding points or features in the image segments from each camera in the same manner as was performed with respect to the entire image described previously. Then the discrepancy amount x between the coinciding points in the stereoscopic image segments is determined at step 124 and used at step 126 to calculate distance data for the image segment. That distance data is stored in a section of the distance picture memory 38 at step 128. The distance picture memory 38 has two sections of additional storage locates in which distance data for image segments are stored. One section stores data for the most recent set of image segments and the other section contains previous image segment distance data with each new group of data overwriting the memory section containing the oldest distance data.

The microprocessor 44 in the distance picture processing system 34 then takes over by computing the change in distance between the two stored sets of distance data at step 130. The change information is stored in the output memory 50 at step 132. Because the distance data is acquired at regular intervals, e.g. every millisecond, the changes correspond directly to a rate of change in distance or in other words the speed at which the object on the seat is moving. The speed can be calculated and stored in the output memory 50 or the air bag controller 54 may simply use the distance change data directly. In either case this data in the output memory corresponds to the object speed.

The speed related data is made available to the air bag controller 54 via the interface circuit 52. The air bag controller 54 regulates the rate at which the air bags 58 inflate in response to the speed at which a vehicle occupant is approaching the respective air bag during an accident.

What is claimed is:

1. A stereoscopic object detection system for sensing and categorizing objects present on a seat of a motor vehicle, the stereoscopic object detection system comprising:

a camera assembly for producing first and second images of the seat in which image features are shifted between the first and second images by an amount corresponding to distances the image features are from the camera assembly;

an image analyzer coupled to the camera assembly and processing the first and second images to determine presence of an object on the seat, and to determine a size of the object in response to a given amount that the object is shifted between the first and second images; and an output device coupled to the image analyzer and producing a signal in an event that the presence of an object on the seat is detected, wherein the signal indicates the size of the object on the seat.

2. The stereoscopic object detection system as recited in claim 1 wherein the camera assembly comprise an image sensor in which segments of the first and second images are randomly accessible.

3. The stereoscopic object detection system as recited in claim 1 further comprising a processor connected to the camera assembly and which determines distances that a plurality of features in the first and second images are disposed from the camera assembly, wherein the distances are determined in response to a given amount that the plurality of features are shifted between the first and second images.

4. The stereoscopic object detection system as recited in claim 3 wherein the image analyzer employs the distances in determining the presence of an object on the seat.

5. The stereoscopic object detection system as recited in claim 3 wherein the image analyzer employs the distances in determining the size of the object on the seat.

6. The stereoscopic object detection system as recited in claim 1 further comprising a image analyzer which employs information from the camera assembly to detect movement of an object on the seat.

7. The stereoscopic object detection system as recited in claim 1 further comprising a pattern detector which receives information from the camera assembly and processes the information to recognize presence of a predefined pattern in at least one of the first and second images.

8. The stereoscopic object detection system as recited in claim 7 wherein the pattern detector comprises a memory for storing a reference pattern; and a processor which detects presence of the reference pattern in the information from the camera assembly.

9. The stereoscopic object detection system as recited in claim 7 wherein the reference pattern is for a child seat.

10. The stereoscopic object detection system as recited in claim 8 wherein the reference pattern denotes a physical characteristic of a motor vehicle operator.

11. The stereoscopic object detection system as recited in claim 1 further comprising a mechanism connected to the output device and controlling deployment of an air bag in response to the signal.

12. The stereoscopic object detection system as recited in claim 7 the camera assembly comprises a pair of cameras.

13. A stereoscopic object detection system for sensing and categorizing objects present on a seat of a motor vehicle, the stereoscopic object detection system comprising:
    a camera assembly for producing first and second images of the seat and objects thereon, in which image features are shifted between the first and second images by an amount corresponding to distances the image features are disposed from the camera assembly;
    a distance processor connected to the camera assembly for determining distances that a plurality of features in the first and second images are from the camera assembly, wherein the distances are determined in response to a given amount that each feature is shifted between the first and second images;
    an analyzer coupled to the distance processor to analyze the distances and determine a size of an object on the seat; and
    a mechanism for controlling operation of a device of the motor vehicle in response to the analyzer.

14. The stereoscopic object detection system as recited in claim 13 further comprising another analyzer employs the distances in determining whether an object is present on the seat.

15. The stereoscopic object detection system as recited in claim 13 further comprising another analyzer which employs the distances in detecting movement of the object.

16. The stereoscopic object detection system as recited in claim 13 further comprising another analyzer which employs the distances in detecting a rate of movement of the object.

17. The stereoscopic object detection system as recited in claim 13 further comprising a pattern detector which processes information from the camera assembly to recognize presence of a predefined pattern in at least one of the first and second images.

18. The stereoscopic object detection system as recited in claim 13 wherein the mechanism controls deployment of an air bag.

19. A method for controlling operation of an air bag in an vehicle, said method comprising step of:
    acquiring an image of a passenger area of the vehicle;
    processing the image to determine a size of a person in the passenger area;
    processing the image to detect movement of the person in the passenger area; and
    controlling operation of the air bag in response to the size of the person in the passenger area and in response to whether movement of the person is detected.

20. The method as recited in claim 19 wherein processing the image to detect movement produces information regarding a rate of movement of the person in the passenger area; and the step of controlling operation of the air bag is further in response to the rate of movement.

21. The stereoscopic object detection system as recited in claim 1 wherein the camera assembly has a single imaging device which produces the first and second images stereoscopically side-by-side.

22. The stereoscopic object detection system as recited in claim 11 wherein the mechanism controls a rate at which the air bag is deployed.

23. The stereoscopic object detection system as recited in claim 13 wherein the camera assembly has a single imaging device which produces the first and second images stereoscopically side-by-side.

24. The stereoscopic object detection system as recited in claim 18 wherein the mechanism controls a rate at which the air bag is deployed.

25. The method as recited in claim 19 wherein controlling operation of the air bag controls a rate at which the air bag is deployed.

26. A system for controlling operation of an air bag in a motor vehicle, which system comprises:
    a camera having an imaging device which stereoscopically produces first and second images side-by-side wherein image features are shifted between the first and second images by an amount corresponding to distances the image features are from the camera;
    an image analyzer coupled to the camera and processing the first and second images to determine presence of a person in the motor vehicle and to determine a size of the person in response to a given amount that the person is shifted between the first and second images; and
    a mechanism for controlling operation of the air bag in response to the size of the person.

27. The system as recited in claim 26 wherein the image analyzer derives a volume measurement of at least a portion of the person; and the mechanism controls operation of the air bag in response to that volume measurement.

28. The system as recited in claim 26 wherein the image analyzer determines a distance that the person is from the camera, and the mechanism controls operation of the air bag in response to that distance.

29. The system as recited in claim 26 wherein the image analyzer produces kinematic information about the person; and the mechanism controls operation of the air bag in response to the kinematic information.

30. The system as recited in claim 26 wherein the image analyzer produces information regarding a rate of movement of the person; and the controls operation of the air bag in response to that rate of movement.

* * * * *

UNITED STATES PATENT AND TRADEMARK OFFICE
CERTIFICATE OF CORRECTION

PATENT NO. : 6,757,009 B1
DATED : June 29, 2004
INVENTOR(S) : Marc R. Simon et al.

It is certified that error appears in the above-identified patent and that said Letters Patent is hereby corrected as shown below:

Column 10,
Line 64, change "the controls" to -- the mechanism controls --.

Signed and Sealed this

First Day of February, 2005

JON W. DUDAS
*Director of the United States Patent and Trademark Office*